C. CHRISTENSEN.
BUS BAR SUPPORT.
APPLICATION FILED MAR. 20, 1920.

1,409,927.

Patented Mar. 21, 1922.
3 SHEETS—SHEET 1.

Inventor
Christen Christensen
By Brown, Boettcher & Dienner
Attorneys

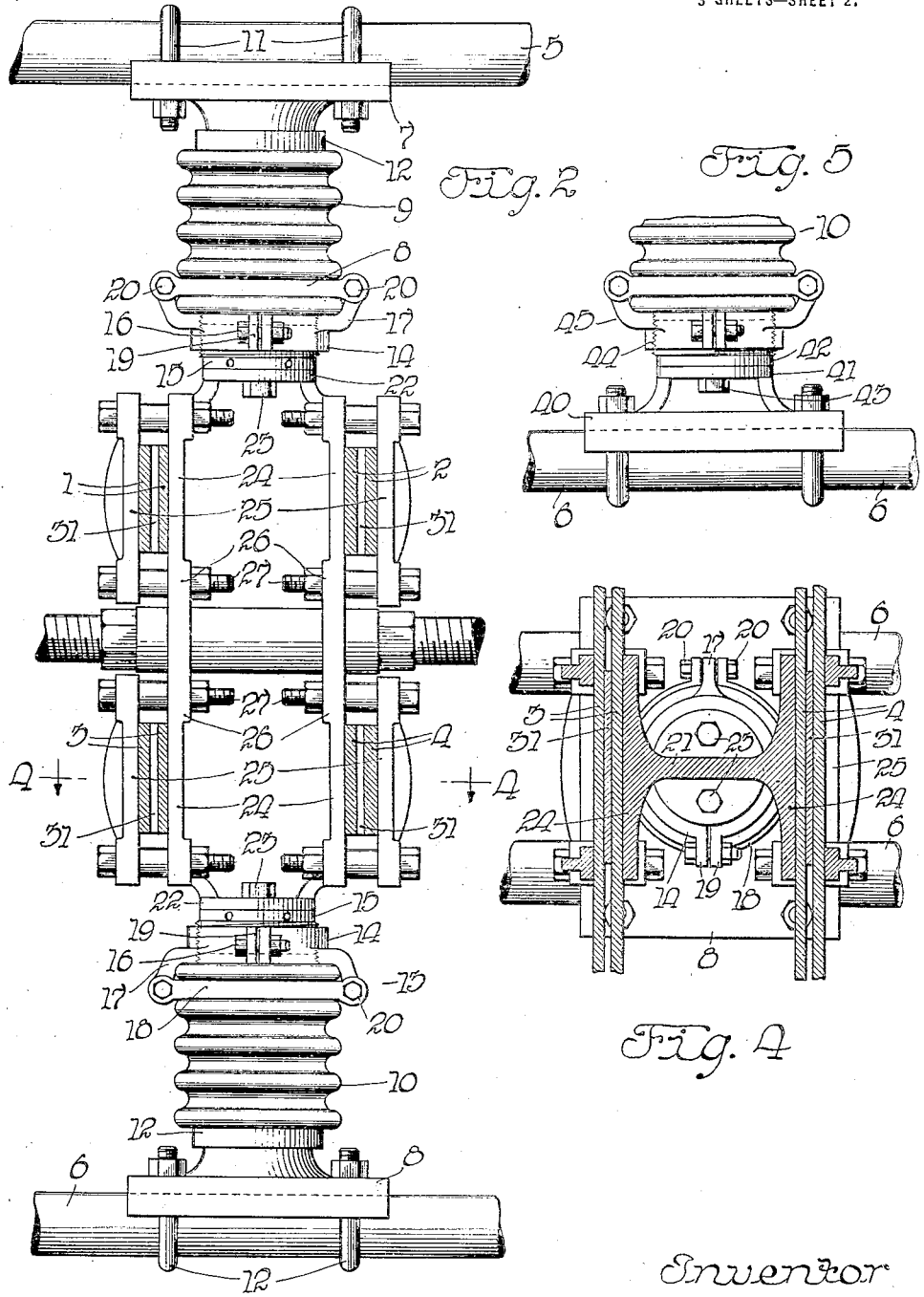

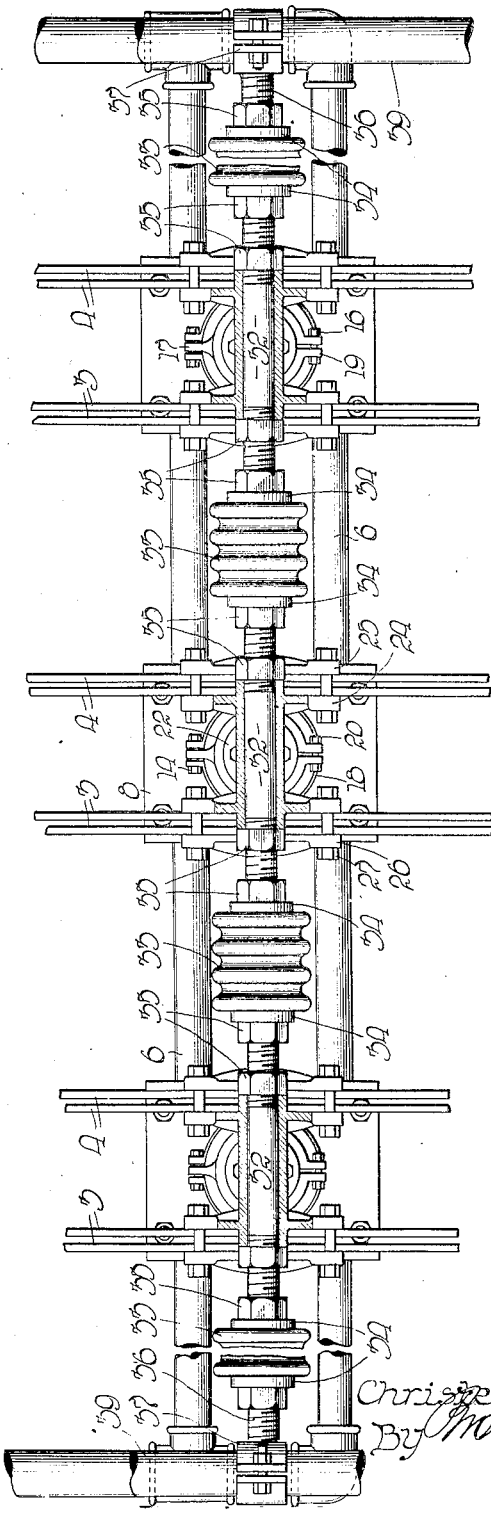

UNITED STATES PATENT OFFICE.

CHRISTEN CHRISTENSEN, OF CHICAGO, ILLINOIS, ASSIGNOR TO ELECTRICAL ENGINEERS EQUIPMENT CO., OF CHICAGO, ILLINOIS, A CORPORATION OF ILLINOIS.

BUS-BAR SUPPORT.

1,409,927.  Specification of Letters Patent.  Patented Mar. 21, 1922.

Application filed March 20, 1920. Serial No. 367,487.

*To all whom it may concern:*

Be it known that I, CHRISTEN CHRISTENSEN, a citizen of the United States, residing at Chicago, in the county of Cook and State of Illinois, have invented a certain new and useful Improvement in Bus-Bar Supports, of which the following is a full, clear, concise, and exact description, reference being had to the accompanying drawings, forming a part of this specification.

My invention relates to improvements in electrical conductor supports and particularly to bus bar supports wherein the bus bars are carried by insulator units, there being one or more of these units for each phase of the circuit.

As disclosed in the co-pending application No. 398,532 it is highly desirable to support the flat bus bars in separated relation as for instance at the corners of a rectangular figure, so that greater current carrying capacity for the amount of copper employed is possible. My invention particularly aims to provide improved means whereby this arrangement of the conductors may be secured and maintained even under the abnormal stresses due to excessive current flow, as under short circuit.

While my invention is particularly adapted for use in connection with electrical conductors of the bus bar type whose cross section is rectangular, being relatively thin and wide, I do not intend to limit the invention to such use or purpose only.

Broadly devices of this type comprise insulators carried by mounting pipes or the like, and bus bar clamping brackets mounted on the free ends of the insulators, the arrangement being in the form of units. These units are assembled upon mounting pipes and are aligned with the bus bars. Frequently the bus bars, due to certain reasons are not in position to be aligned properly with the units, and hence the prevailing stresses are not advantageously distributed upon the insulators. Where a multi-phase circuit is employed, and an individual unit is employed for each phase, difficulty has been encountered in keeping the same properly aligned in respect to each other and the dynamic stresses often cause displacement. It has also been found from a constructional point of view, that difficulty is encountered in accurately aligning the bus bars.

It is the aim of my invention to overcome the above difficulties by providing universal insulator clamps whereby vertical and horizontal adjustment in respect to the units may be obtained. By this arrangement the stresses both structural and dynamic are uniformly placed upon the carrying frame, thereby securing a most advantageous distribution of material.

By my invention the units are positively and rigidly maintained in proper position, so that horizontal displacement of the same is prevented by the provision of adjustable means tying or connecting the unit of each phase of the circuit in a spaced relation to each other.

It is a further aim of my invention to provide a supporting unit for bus bars or the like which is characterized by flexibility of adjustment, simple, compact and easily assembled in accurate alignment with the bus bars, and one which is universal in its adaptation to bus bars of various sizes.

Various other advantages of my invention and novel structural details will appear from the following detail description and from the accompanying drawings, in which:

Figure 2 shows in side elvation a supporting unit shown in Figure 1;

Figure 3 shows in longitudinal section one of these units for each phase of the circuit and the means for rigidly tying the units together, so that adjustment may be had, permitting alignment of the unit with the bus bars;

Figure 4 shows a cross section of the clamping plate supporting the bus bars shown in Figure 2, taken on the line 4—4; and Figure 5 shows a modification wherein is illustrated adjusting means between the insulators and supporting frame.

Figure 1:
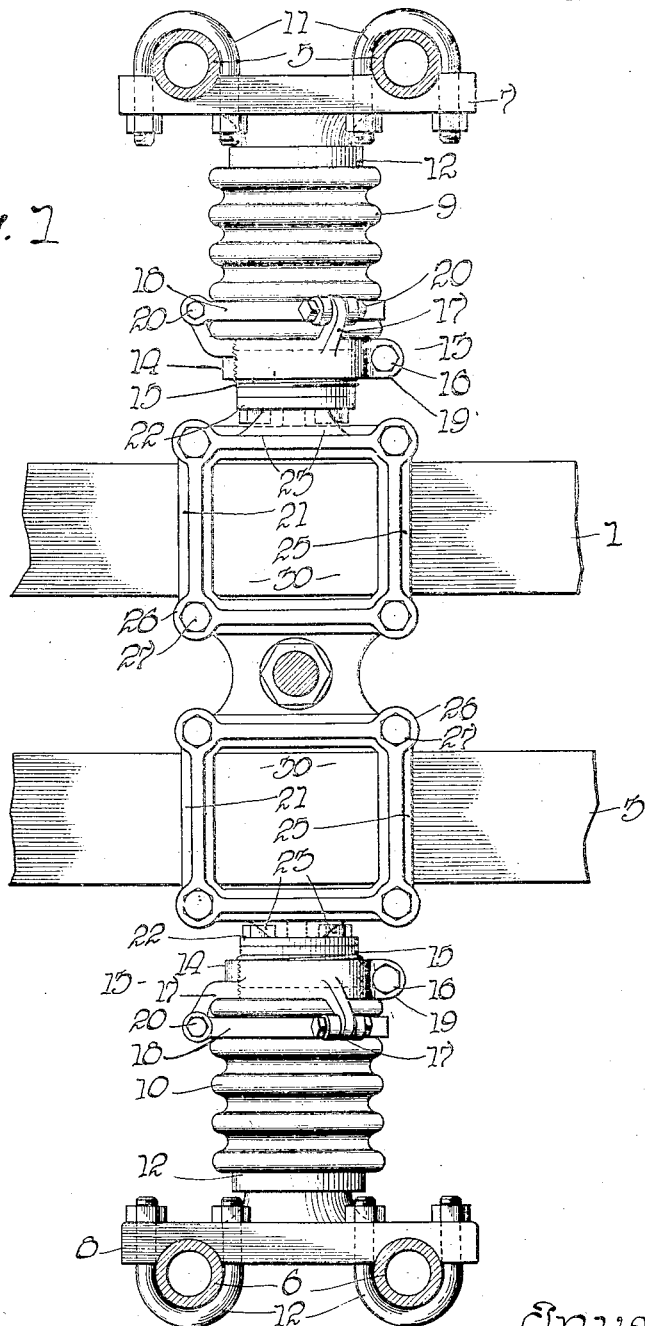
Figure 1 shows in front elevational view a support embodying my invention in the form of a unit for carrying one or more bus bars.

As shown in Figures 1 and 2 I have provided the bus bars 1, 2, 3 and 4 which are preferably of copper for carrying the current. The bus bars are supported in the usual manner, which I shall now describe, from the frame, which may be made of the well known pipe construction or any other construction. The conductors are carried by this frame in supporting units, which units may singly or otherwise support the conductors of a single phase of the circuit. In this case I have shown the frame as constructed of the upper pipes 5 and the lower pipes 6 with the bases 7 and 8 of the insulators 9 and 10 respectively bolted to said frames by suitable U bolts or clamps 11 and 12. The insulators may be of any desired size or characteristic, or in fact any suitable insulated bodies may be employed. The insulators 9 and 10 at their outer ends have recesses formed therein and in the recesses are cemented as desired, the metallic thimbles 12 to which the bases 7 and 8 are cast or formed. If desired, the insulators 9 and 10 may be clamped by sectional clamps such as I shall now describe.

The clamps 13 of the general character described in the co-pending application of Ernest H. Jacobs, or any other suitable clamps are secured to the inner or opposite ends of the insulators 9 and 10, the construction of which shall be presently described. The body of the clamp 13 comprises the annular band 14 having the inner periphery preferably screw threaded for the reception of a co-operating screw threaded block 15. The band 14 is preferably split, the ends thereof having formed thereon the outwardly extending lugs 19 through which the bolts 16 pass for clamping the lugs together. The band 14 is provided with a plurality of outwardly extending arms 17. The upper groove of the insulators 9 and 10 is engaged by a sectional annular ring 18. The ends of the sectional annular ring 18 engage the ends of the co-operating arms 17, these ends being clamped together as by bolts 20. Thus it will be seen that the clamps employed are capable of universal adaptation, that the clamp is capable of being adjusted to meet the various demands of different sizes of insulators and the block 15 is capable of adjustment in the band 14 to allow for different lengths of insulators or inaccuracies in the mounting of the same.

Clamping brackets or plates 21, having suitable bases 22 at the opposite ends are mounted on the block 15 by means of the bolts 23. The clamping bracket 21, as illustrated, is of I formation and is provided with the inner integral plates 24 and the removable outer plates 25. These plates 24 and 25 have at the outer corners lugs 26. Bolts or studs 27 pass through the lugs 26, these bolts or studs being of such size that the number of bus bars carried in the line may be varied as desired. The central part of each removable plate is cut away as indicated at 30 in Figure 1, but any desired form of clamp may be used. The conductors 1, 2, 3 and 4 have their flat faces clamped against the inner sides of the plates 24 and 25 and suitable spacing members 31 hold the conductors apart horizontally. Thus the conductors 1, 2, 3 and 4 are held out of contact with each other at such a distance as will permit the air to freely circulate around them, thereby reducing the well known temperature rise and also to avoid the uneven distribution of current due to the skin effect of the flow of current through the conductors.

By referring more particularly to Figure 3, wherein I have shown an individual unit for each phase of the circuit, it will be seen that the central portion of the web of the I-shaped bracket 21 is enlarged for the reception of the bolts or studs 32. Spaced in alignment between the supporting units are the insulators 33, of any suitable size or character, but preferably of the post type illustrated.

The insulators 33 have each end thereof recessed so as to receive the thimble 34, as by cementing or the like. The thimbles 34 are provided with axial threaded openings into which the bolts or studs 32 are threaded. Lock nuts 35 are provided at the outer faces of the thimbles 34 and also lock nuts are provided at the enlarged portion of the I-shaped bracket 21. The end studs 36 are threaded at one end into the thimble 34 and at the other or opposite end the split clamping members 37 are formed. The clamping members 37 are clamped upon transverse pipes 39 comprising part of the farmework hereinbefore mentioned, or any suitable support desired.

There are certain times when it is desirable to have an adjustment between the framework and the insulators 9 and 10 of each unit, as for instance when the inner ends of the insulators are not conveniently accessible. This adjustment may be obtained by employing sectional clamps, at the mentioned ends of the insulators, receiving screw threaded blocks similar to the manner heretofore described. Such an arrangement is illustrated in the modification shown in Figure 5. The base member 40 is provided with a suitable base 41 to which is bolted the screw threaded block 42 as by the bolt 43. The annular band 44 of the sectional clamp 45 is adapted to receive the threaded portion of the block 42. The sectional clamp 45 is secured to the insulators 9 and 10 in the usual manner. To make an adjustment the bolts 43 are removed or threaded far enough outwardly so as not to engage the block 42. Any suitable wrench is then employed to thread the block 42 inwardly or outwardly, according to the adjustment being made.

It will be understood by the arrangements shown that any particular form of clamp may be employed on the insulators 9 and 10 so long as an adjustment vertically may be obtained. The annular band 14 in the embodiment shown does not seat upon the ends of the insulators 9 and 10. The downwardly extending arms are so clamped to the segmental clamping ring, that the clamping stress is always one of compression and that the downward stresses on the clamps are so imparted by this arrangement to the insulators, that the stresses are evenly and uniformly distributed. The annular band 14 may be constructed to embrace blocks or insulators of various sizes.

The studs 32 and insulators 33, which connect the units together, prevent horizontal displacement on the units when a dynamic stress occurs, and a flexible adjustment is obtained between the units which permits easy assembly and accurate alignment of the conductors and which holds the conductors firmly in place.

While I have described my invention in connection with the above embodiment, it will be understood that I do not intend to limit myself to the exact mechanical constructions shown, as I may employ other equivalent constructions without departing from the spirit of my invention.

I claim:

1. In a conductor support, bracket members for rigidly supporting conductors, block members, said block members secured to said brackets at each end thereof, non-conducting bodies adapted to receive said block members, and clamping means for engaging the block members and the bodies.

2. In a conductor support, bracket members having base portions at the ends thereof, block members, means securing said base portions to said block members, non-conducting bodies to receive said block members, and clamp members to connect the block members and the non-conducting bodies, said clamp members permitting an adjustment of the block members in respect to the non-conducting bodies.

3. In a unit for supporting electrical conductors comprising a pair of oppositely disposed non-conducting bodies, block members receivable at the inner ends of said bodies, bracket members for carrying the conductors, said block members being secured to said bracket members, and means connecting the block members and the bodies thereby permitting alignment of the conductors and the bracket members.

4. In a unit for supporting electrical conductors comprising, oppositely disposed non-conducting bodies, block members receivable at the inner ends of said bodies, members for carrying the conductors, said block members being carried by the second said members, and clamps on the inner ends of the bodies receiving the block members, said clamps having means whereby the block members may be adjusted toward and away from said bodies.

5. In means for supporting electrical conductors, a plurality of supporting units comprising, oppositely disposed non-conducting bodies, bracket members for carrying the conductors, said bracket members being adapted to be secured to said bodies, and means longitudinally connecting the units together.

6. In means for supporting electrical conductors, a plurality of supporting units comprising, oppositely disposed non-conducting bodies, bracket members for carrying the conductors, said bracket members being adapted to be secured to said bodies, and means longitudinally connecting the units, said means permitting horizontal adjustment of the unit.

7. In means for supporting electrical conductors, a plurality of supporting units comprising, oppositely disposed non-conducting bodies, bracket members for carrying the conductors, block members secured to said bracket members, said block members being adjustable on either ends of said bracket members, and means longitudinally connecting the units thereby permitting horizontal adjustment of the units.

8. In means for supporting electrical conductors, a plurality of supporting units comprising, oppositely disposed non-conducting bodies, bracket members for carrying the conductors, said bracket members adapted to be secured to the said bodies and receive a stud, the studs of the units opposite each other engaging an insulator at either end thereof, said studs and insulators providing an adjustment for the alignment of the brackets and the conductors.

9. In means for supporting electrical conductors, a plurality of supporting units comprising oppositely disposed non-conducting bodies, an I-shaped member having cooperating brackets for supporting conductors, block members secured to the ends of said brackets, an adjustable clamp on said bodies and carrying said block members and permitting a vertical adjustment of the block members, said I-shaped member receiving a stud secured to an insulator, said stud forming through said insulator a connection to the adjacent unit, the other end of said stud secured to an insulator rigidly mounted on a frame, said studs and insulators having adjustment relative to each other.

10. In combination, a metallic framework, a plurality of conductors arranged at the corners of a polygon, vertically extending insulators extending to the framework above and below the conductors, spacing and clamping means for holding the conductors in properly spaced relation to each other and adjustable connecting means between the spacing and clamping means and the adjacent ends of the insulators.

11. In combination, a metallic framework, a plurality of conductors arranged at the corners of a polygon, vertically extending insulators connected to the frame work below or above the conductors, spacing and clamping means for holding the conductors in properly spaced relation to each other, adjustable connecting means between the spacing and clamping means and the adjacent ends of the insulators, and insulated connecting means between adjacent spacing and clamping means for different phases.

12. In a multi-phase transmission line, a plurality of conductors of oblong cross section arranged with their longer flat sides disposed vertically, insulator supporting units for said conductors, and connecting means separate from said insulator supporting units for tying said supporting units together to prevent lateral displacement of the conductors due to current flow.

13. In a multi-phase transmission line, plurality of conductors arranged at the corners of a rectangle, a frame work adjacent the conductors, insulator supporting units for conductors of different phases, said supporting units carried by and being adjustable in respect to the framework, insulated connecting means between the different units, said means being adjustable and preventing lateral displacement of said units in respect to each other due to current flow.

In witness whereof I hereunto subscribe my name this 13th day of March, A. D. 1920.

CHRISTEN CHRISTENSEN.